United States Patent
Ohwa et al.

[11] Patent Number: 5,850,079
[45] Date of Patent: Dec. 15, 1998

[54] CARD READER WITH A THEFT COUNTER MEASURE

[75] Inventors: Junji Ohwa; Kenji Hirasawa, both of Nagano, Japan

[73] Assignee: Sankyo Seiki Mfg.Co., Ltd., Nakano-ken, Japan

[21] Appl. No.: 598,284

[22] Filed: Feb. 8, 1996

[30] Foreign Application Priority Data

Feb. 22, 1995 [JP] Japan .................................. 7-033875
Mar. 29, 1995 [JP] Japan .................................. 7-071665

[51] Int. Cl.$^6$ ........................... G06K 13/00; G06K 07/06
[52] U.S. Cl. ......................... 235/475; 235/441; 235/486; 902/31; 194/351
[58] Field of Search .................... 235/441, 475, 235/486; 902/31; 463/17, 18; 194/351

[56] References Cited

U.S. PATENT DOCUMENTS

| | | | |
|---|---|---|---|
| 3,818,187 | 6/1974 | Lovendusky et al. ................... | 235/380 |
| 3,946,204 | 3/1976 | Taniguchi et al. .................... | 235/61.11 |
| 4,035,614 | 7/1977 | Frattarola et al. ...................... | 235/475 |
| 4,171,737 | 10/1979 | McLaughlin ............................. | 902/31 |
| 4,871,054 | 10/1989 | Murray .................................... | 194/212 |
| 4,873,425 | 10/1989 | Langrais et al. ......................... | 235/441 |
| 4,889,978 | 12/1989 | Koshion et al. ......................... | 235/379 |
| 4,992,647 | 2/1991 | Konishi et al. .......................... | 235/379 |
| 5,264,688 | 11/1993 | Matsumo et al. ........................ | 235/480 |
| 5,317,137 | 5/1994 | Wilkins .................................... | 235/380 |
| 5,508,501 | 4/1996 | Fujimoto et al. ....................... | 235/486 |
| 5,577,589 | 11/1996 | Tinoco .................................... | 194/351 |
| 5,590,609 | 1/1997 | Ramachandran et al. ............. | 194/351 |
| 5,635,696 | 6/1997 | Dabrowski .............................. | 194/351 |

FOREIGN PATENT DOCUMENTS

| | | | |
|---|---|---|---|
| 0673718 | 3/1990 | Switzerland ........................... | 194/351 |
| 2231993 | 11/1990 | United Kingdom ................... | 194/351 |

Primary Examiner—Donald Hajec
Assistant Examiner—Douglas X. Rodriguez
Attorney, Agent, or Firm—McAulay Nissen Goldberg Kiel & Hand, LLP

[57] ABSTRACT

A card reading system comprises a card insertion portion, a shutter for preventing foreign matter insertion and the like, a driving path for direction of an inserted card and a main card reading device. The system includes, as an improvement, a detection device for determining a condition of the shutter during a card reading operation and for providing an output signal of the determination and a device responsive to the output signal for indicating that the shutter is in an improper condition when foreign matter is inserted in the driving path.

12 Claims, 15 Drawing Sheets

CARD READER WITH A THEFT COUNTER MEASURE

BACKGROUND OF THE INVENTION a) Field of the Invention

This invention relates to a card reader having the function of a card theft counter measure, specifically, a card reader with a card theft counter measure to the use of a trapping device for stealing cards from others.

b) Description of the Related Art

Recently, crimes are reported in which one traps a card in an Automatic Transfer Machine (ATM) in remote places with foreign matter and picks it up later for fraudulent use. Many card readers currently used have shutters near a card insertion slot to prevent the machine from foreign matter insertion. These shutters prevent continuous insertion of a card, pulling of the card, and the like as well as insertion of foreign matter, but do not detect foreign matter such as a trap intended for the above crime.

Usually the above foreign matter used as a trap is of a fish hook type into which a thin wire, a film, or the like is bent. Such foreign matter is installed by any method by a criminal and used for criminal purposes as follows: after a legal user inserts a card into a card reader and the card is once taken into the system, a difficulty is caused so that the card does not come out; after the operator leaves the machine, the criminal takes the card and the foreign matter together and uses the card to criminally withdraw cash and the like.

OBJECT AND SUMMARY OF THE INVENTION

A primary object of this invention is to resolve the above drawback by detection of foreign matter such as a card trap for stealing another's card, and to prevent card theft.

In accordance with the invention, a card reading system has a card insertion portion, a shutter for preventing foreign matter insertion and the like, a driving path for direction of an inserted card and a main card reading device. The system includes, as an improvement, detection means for determining a condition of the shutter during a card reading operation and for providing an output signal of the determination and means responsive to the output signal for indicating that the shutter is in an improper condition when foreign matter is inserted in the driving path.

DESCRIPTION OF THE PREFERRED EMBODIMENTS

EXAMPLE 1

Figure 1:
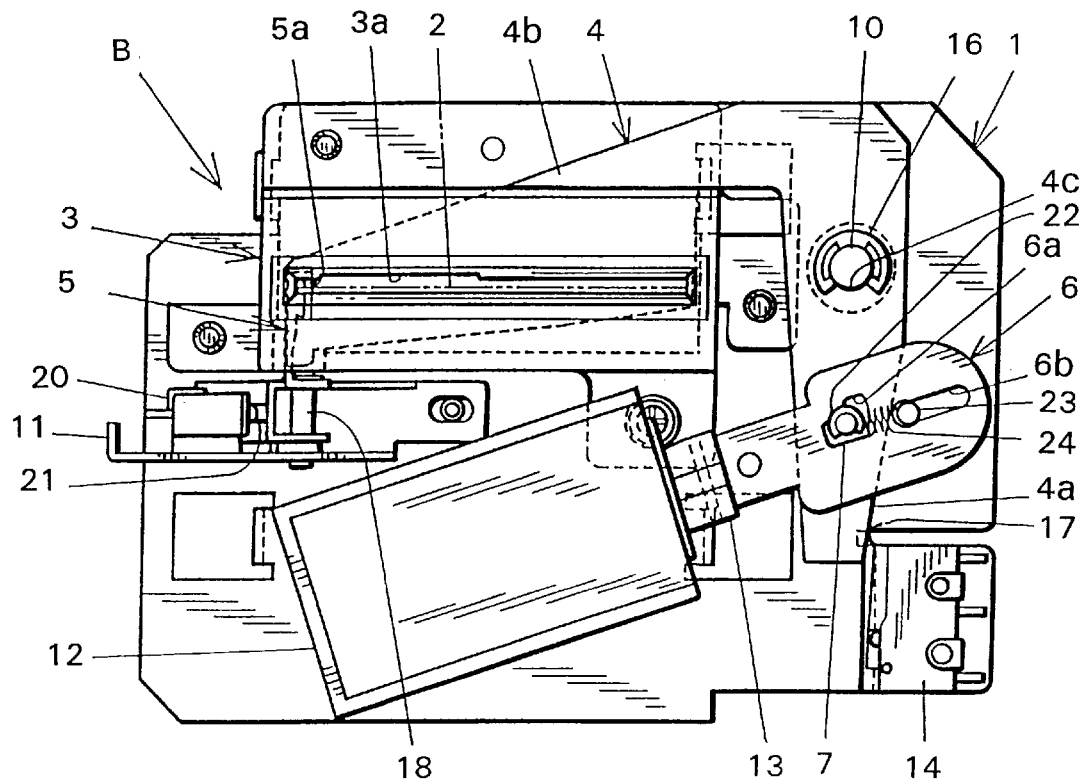
FIG. 1 illustrates example 1 of this invention wherein a plate shutter is installed, and is a plan drawing a shutter device of a card reader.

A card reader of Example 1 of this invention will be described referring to FIGS. 1 through 11. In FIG. 1, a card reader main device A is mounted on the back of substrate 1 and a shutter device B is mounted on the front of substrate 1.

The shutter device B mounted on the front of substrate 1 comprises a gate block 3 for a magnetic card 2. In FIG. 1, a shaft 10 is fixed on substrate 1 to the side of the gate block 3, and a plate shutter 4 is rotatably supported thereby. A support member 11 of a detection lever 5 that detects the insertion of the magnetic card 2 is mounted on substrate 1 at the bottom left of the gate block 3. Further, a solenoid 12 is fixed on substrate 1 at the bottom of the gate block 3. A plunger 13 with an iron core is movably inserted into the solenoid 12, and an actuation plate 6 is mounted thereon. The solenoid 12 is connected to a control system that is not illustrated.

A detector 14 comprised of micro switches that detect the closing condition of the shutter 4 is mounted on the lower right of substrate 1. The detector is connected to a control system that is not illustrated, and, also, if the shutter 4 is open when it must be closed, the above control system is programmed to display that the card reader is unable to process or to provide an alarm by means of an alarm system (e.g. buzzer) that is not illustrated.

Figure 2:
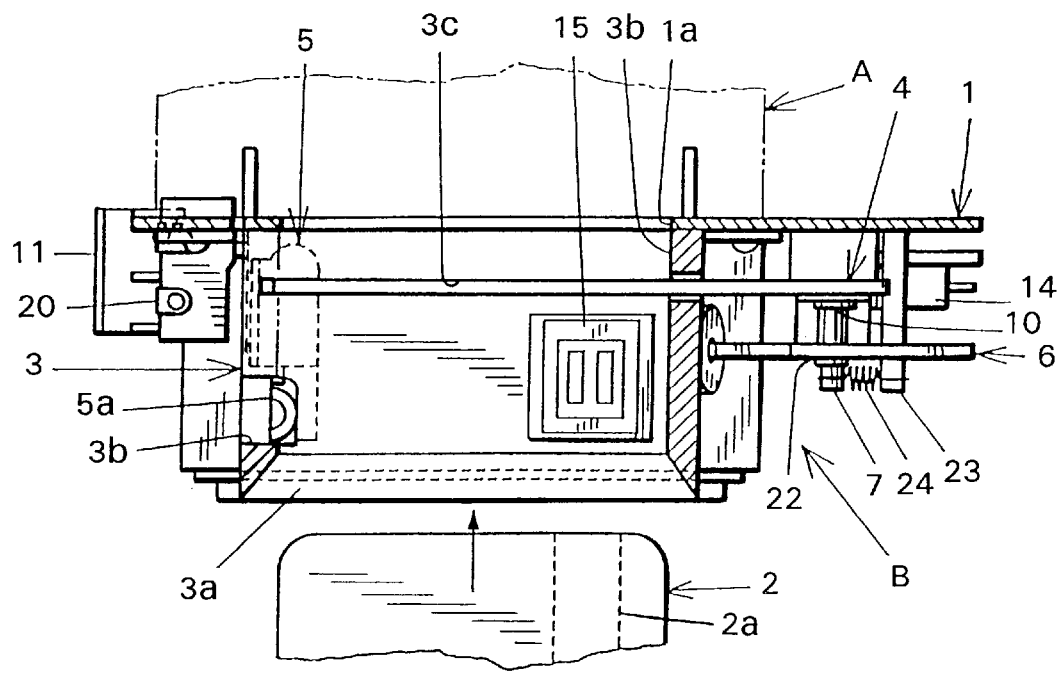
FIG. 2 illustrates a plan cross-section of the main part of the shutter device of the card reader of example 1.
Figure 3:
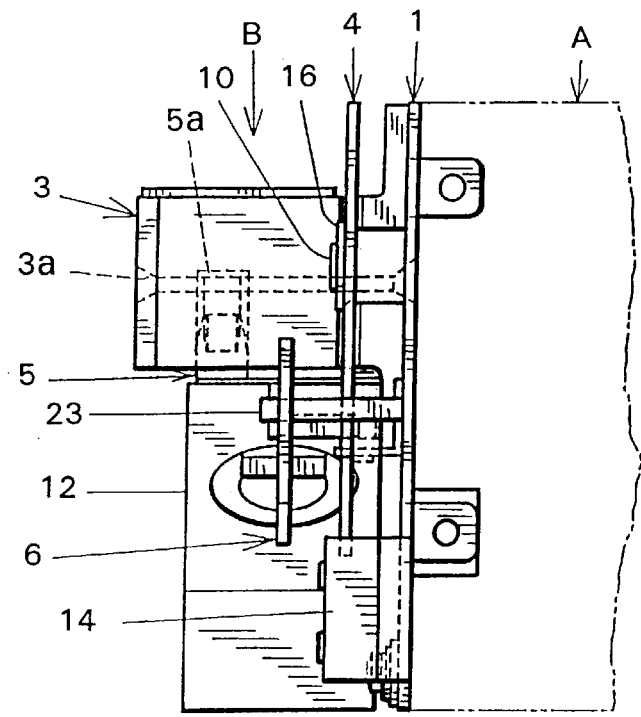
FIG. 3 illustrates a side view of the shutter device of the card reader of example 1.
Figure 4:
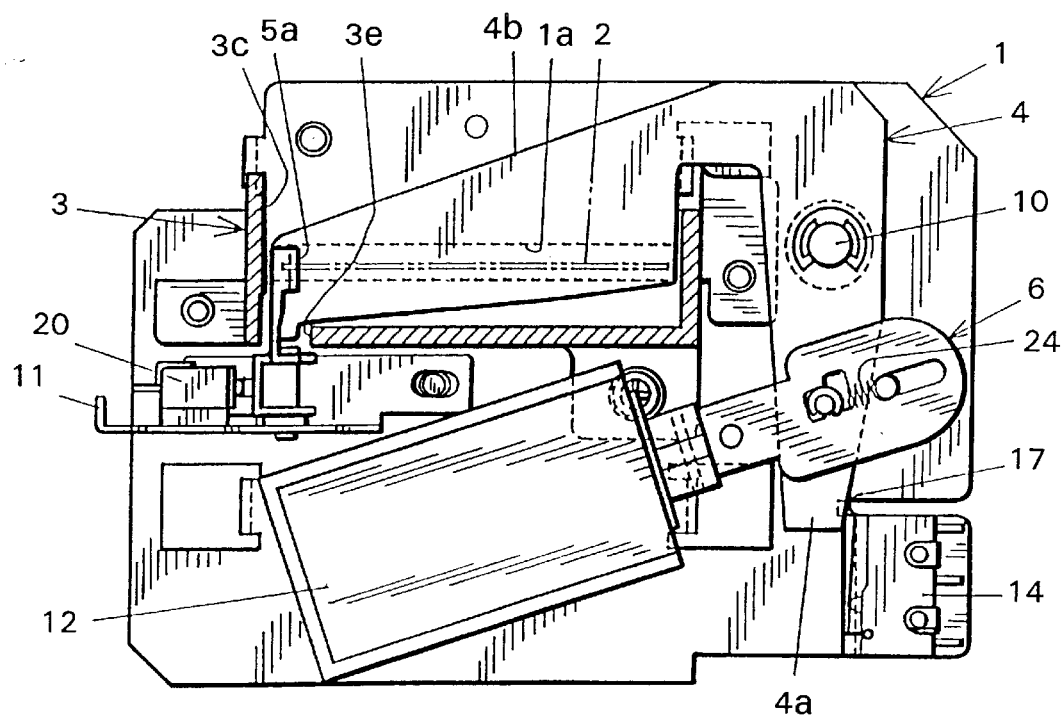
FIG. 4 illustrates a front cross-section of a main part of the shutter device of the card reader of example 1.

On the magnetic card 2, as partially illustrated in FIG. 2, a magnetic stripe 2a is formed to record information. Formed in the gate block 3 are an insertion hole 3a in which the magnetic card 2 is inserted, a driving path 3b along which the magnetic card 2 is driven, a vertical space 3c into which the shutter 4 is inserted across the driving path 3b, and through holes 3d and 3e (see FIG. 4) at which the detect section 5a of the detection lever 5 can be inserted along the driving path 3b. A magnetic head 15 that detects the insertion of the magnetic card 2 is formed facing the driving path 3b and connected to a control system that is not illustrated. A through hole 1a is projected to substrate 1 at the back of the driving path 3b.

Figure 5:
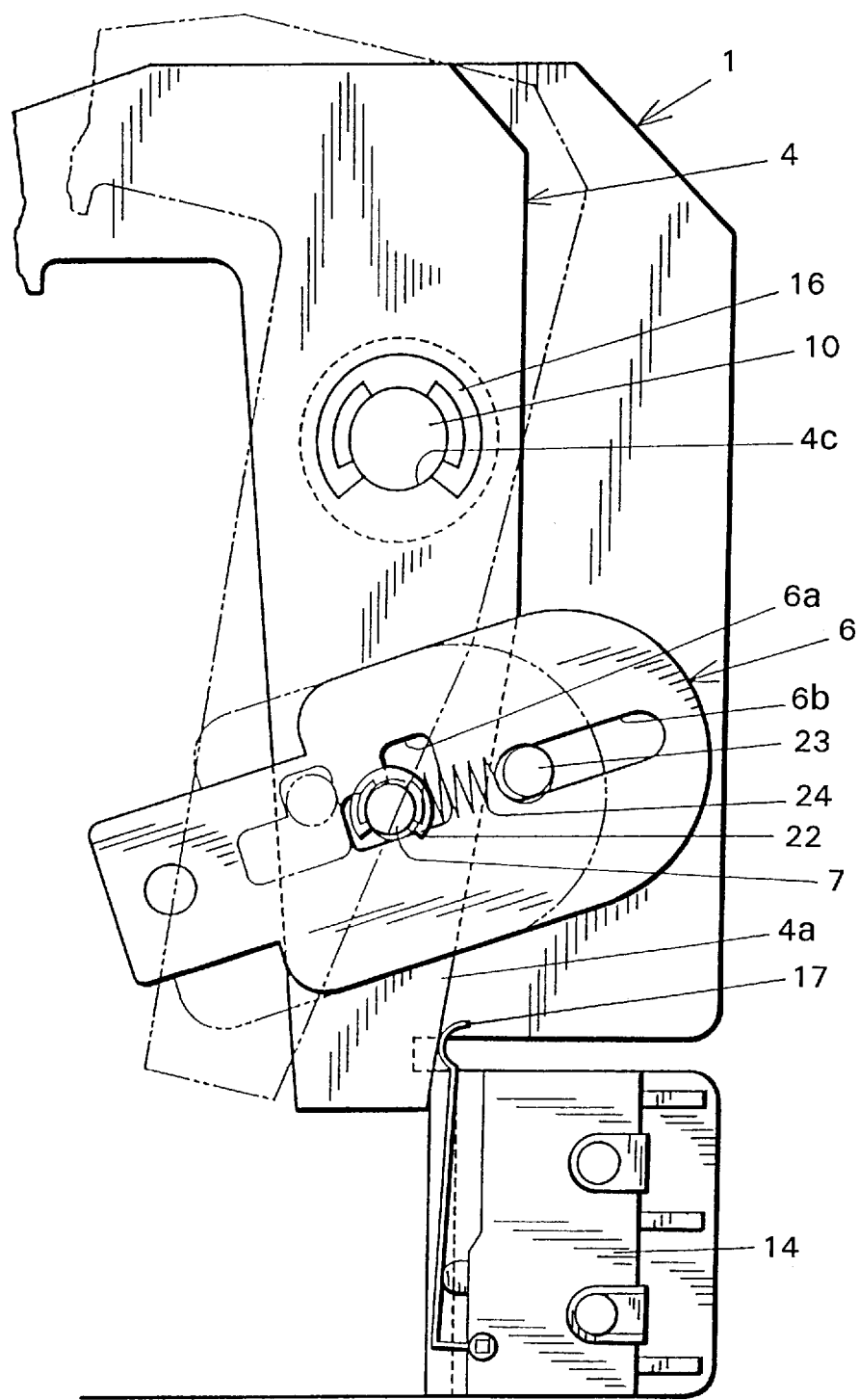
FIG. 5 illustrates a magnified front view of the main part of the shutter device of the card reader example 1.
Figure 6:
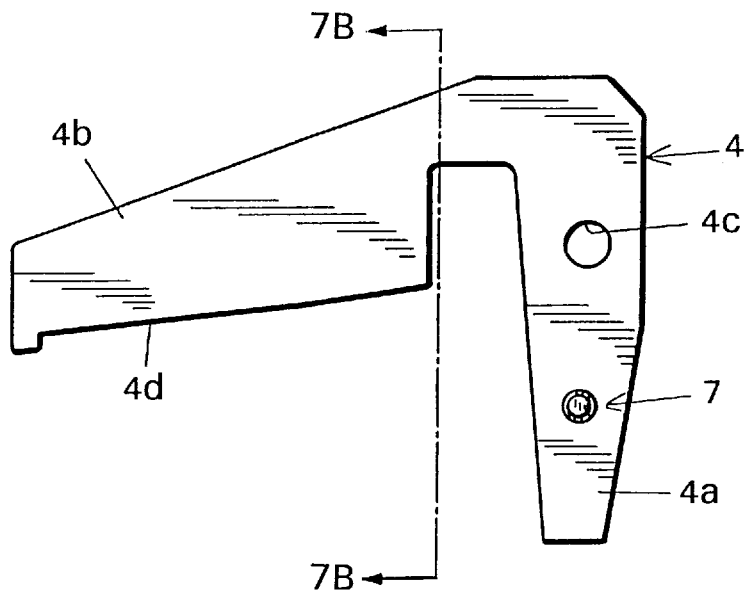
FIG. 6 illustrates a front view of the plate shutter of example 1.
Figures 7A, 7B:
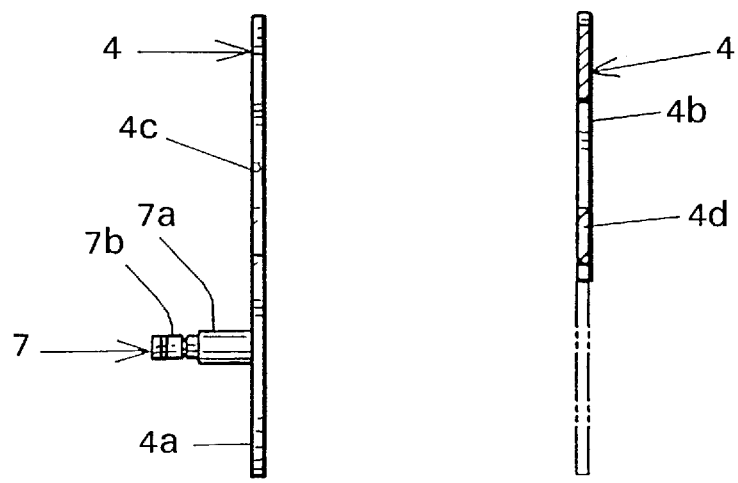
FIG. 7 illustrates (a) a side view of the plate shutter and (b) a side view cross-section b of FIG. 6.

The plate shutter 4, as illustrated in FIGS. 5 through 7, comprises a vertical piece 4a and a horizontal piece 4b that are formed in reversed L shape. A support hole 4c is formed on the vertical piece 4a and a shaft 10 is inserted therein and held with E-Ring 16. A shaft 7 having a larger diameter section 7a and a smaller diameter section 7b is fixed on the plate shutter 4; as illustrated in FIG. 7, a periphery groove and another periphery groove for a spring are formed in the smaller diameter section 7b. An actuator 17 of the detector 14 contacts the bottom-right of the vertical piece 4a of the plate shutter 4. The detector 14 is adjusted and mounted so that the detected signal is put out when the vertical piece 4a is away from the actuator 17. The horizontal piece 4b of the plate shutter is formed to cover the entire width of the driving path 3b and at the same time, a blade 4d is formed at the bottom end of the horizontal piece 4b. It is preferable that the wall of the vertical space to which the shutter is inserted across the driving path 3b is formed in a blade shape so that the cutter is shaped like a hilt with the cutter blade 4d. Rotation strokes of the above plate shutter 4 are the ones necessary to detect a thin and elastic trap member or to cut it.

Figure 8:
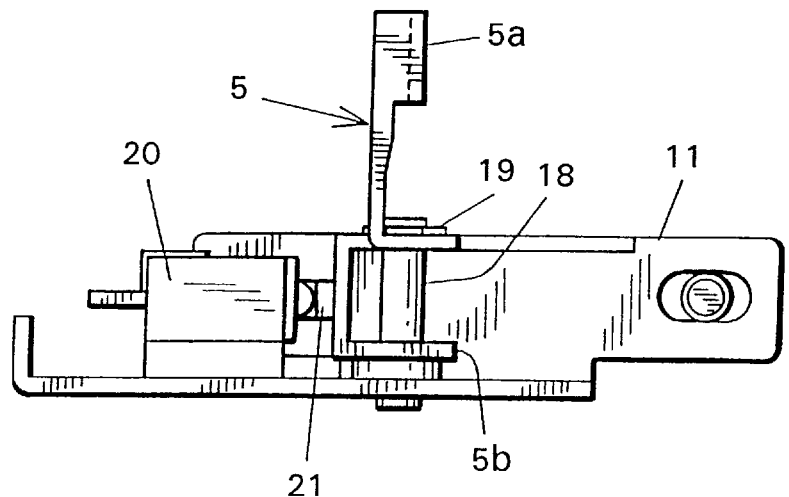
FIG. 8 illustrates a magnified side view of the detection lever of example 1.
Figure 9:
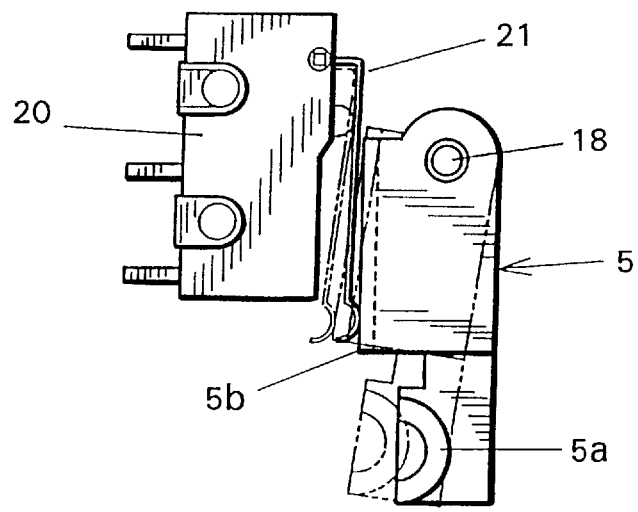
FIG. 9 illustrates a magnified plan view of the detection lever of example 1.

The detection lever 5 is, as illustrated in FIGS. 8 and 9, movably supported and held with an E-ring in such a way that a horizontally dented section 5b is movably supported by a shaft 18 that is fixed on the support member 11. The detect section 5a is projected upwardly from the horizontally dented section 5b. The detector 20 that is comprised of micro switches is mounted on the side of the horizontally dented section 5b of the support member 11 so that the actuator 21 contacts the horizontally dented section 5b; also it is connected to a control system that is not illustrated.

As illustrated in FIG. 5, an actuation hole 6a and a guide hole 6b are formed on the actuator plate 6 which is mounted on plunger 13. The shaft 7 fixed on the plate shutter 4 is inserted to the actuator hole 6a and the plate shutter 4 is held by the E-ring. A shaft 23 fixed on substrate 1 is inserted to the guide hole 6b; a coil spring 24 is expanded between the shaft 7 and a shaft 23 to transmit force in the closing direction of the shutter 4.

Figure 10:
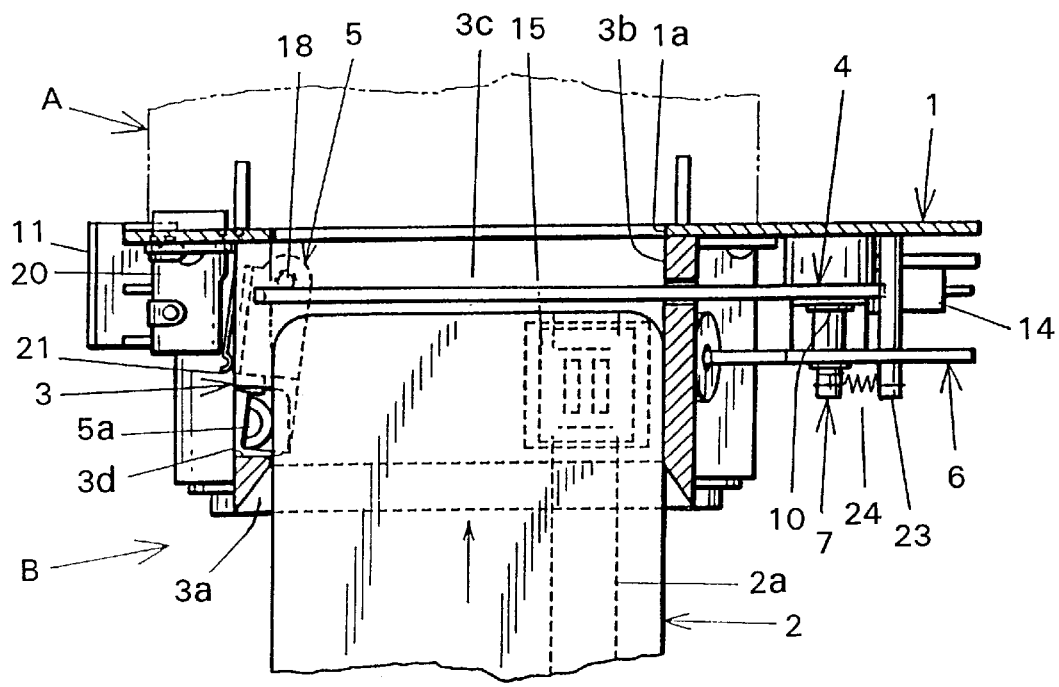
FIG. 10 illustrates a cross-section of the shutter device of the card reader of example 1 when a magnetic card is inserted.
Figure 11:
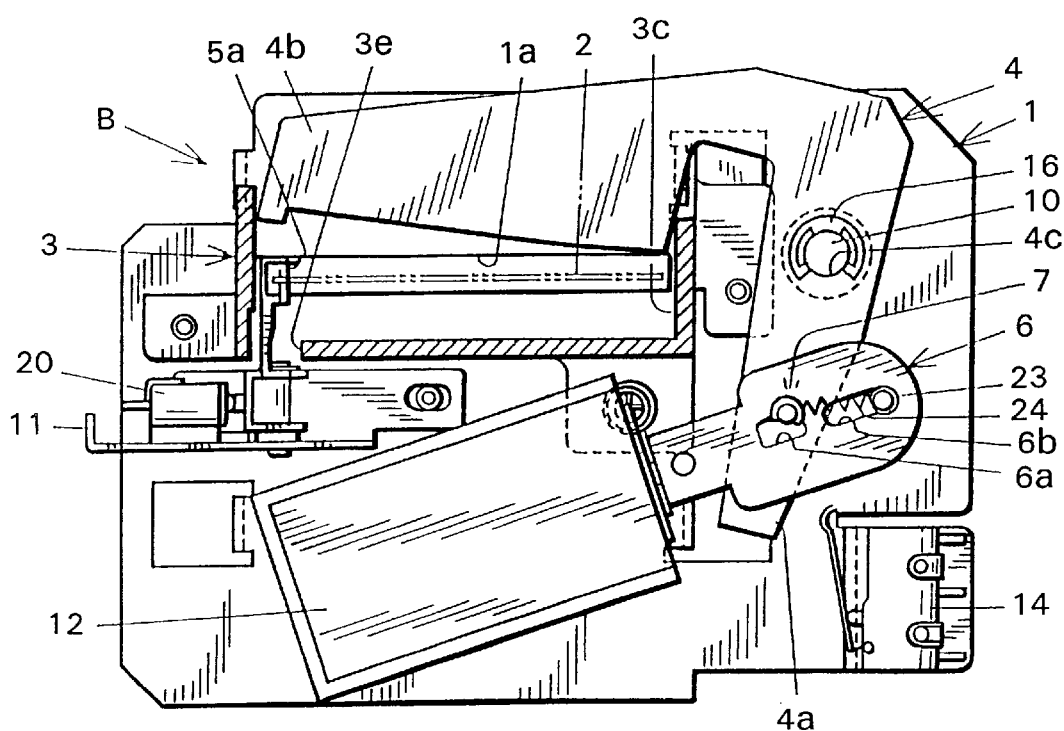
FIG. 11 illustrates a cross-section front view of the shutter device of the card reader of example 1 when the shutter is open.

As illustrated in FIG. 10, when the magnetic card 2 is inserted into the driving path 3b through the insertion slot 3a, the detect section 5a of the detection lever 5 is actuated and the detected signals are provided by the detector 20; at the same time, the information stored on the magnetic stripe 2a is read by the magnetic head 15 and the inserted card is recognized as a magnetic card. Using either one of the above detected signals or the information reading signal outputs, or using both, the plunger 13 and the actuation plate 6 are actuated against a coiled spring 24 by means of the electrification of the solenoid 12 via a control system, which is not illustrated. With this actuation, the plate shutter 4 is actuated and opened as illustrated in FIG. 11 and the magnetic card 2 is taken into the card reader main device A from the driving path 3b through the hole 1a of substrate 1. Once the magnetic card 2 is taken into the system, because the detect section 5a returns to its home position and the solenoid 12 is discharged, the plate shutter 4 is closed by the coiled spring 24.

When such operations as reading/recording of the above magnetic card 2 finishes inside the card reader main device A, the plate shutter 4 is opened again and the magnetic card 2 is returned to the insertion slot 3a of the shutter device B. After the magnetic card 2 is taken out from the driving path 3b and the detect section 5a is returned to its home position, the plate shutter 4 is closed. The open/close condition of the plate shutter 4 is detected by the detector 14, and the plate shutter 4, when the card is taken out, must be in a closed condition; if the plate shutter is open at this time, the system is programmed to trigger an alarm, to display the fact that the card cannot be processed, to buzz, and to disable the card reader main device A function.

When a trap is set up on the shutter device B in the card reader, it is understood that a magnetic card and a trap member, which is not illustrated, are inserted together from the insertion slot 3a, then, the plate shutter 4 is opened, the magnetic card removed, and only the trap member is left. In this invention, however, the plate shutter 4 is formed so that it transmits force in the closing direction from the coiled spring 24 and, at the same time, its horizontal piece 4b covers the entire width of the driving path 3b. In addition, the cutter blade 4d is present at the bottom end of its horizontal piece 4b. As a result, the above trap member can be cut if soft or thin, and it loses its effectiveness as a trap member. For the case where the trap member that is too hard or thick to be cut, the detector 14 detects that the plate shutter 4 is not closed, so the card reader main device A can be disabled or an alarm, which is not illustrated, goes off. In this way, a problem occurring where someone uses the card reader without knowing that a trap is set up and has the card taken away is prevented. As a result, the invention functions to prevent a crime such as the theft of a card from someone for fraudulent uses.

EXAMPLE 2

Figure 12:
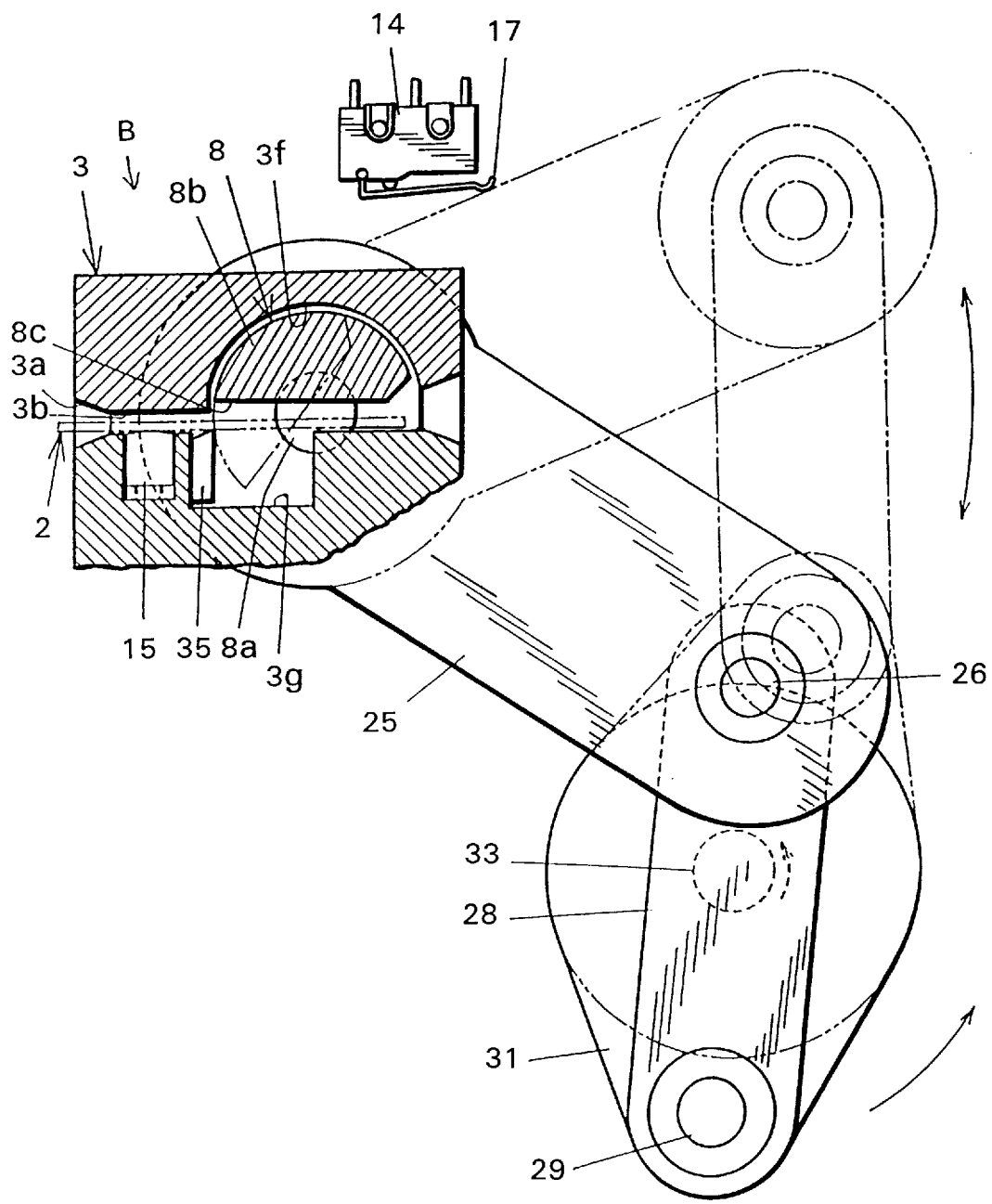
FIG. 12 illustrates example 2 of this invention wherein a rotary shutter is installed and a cross-section side view of the main part of a shutter device of a card reader.
Figure 13:
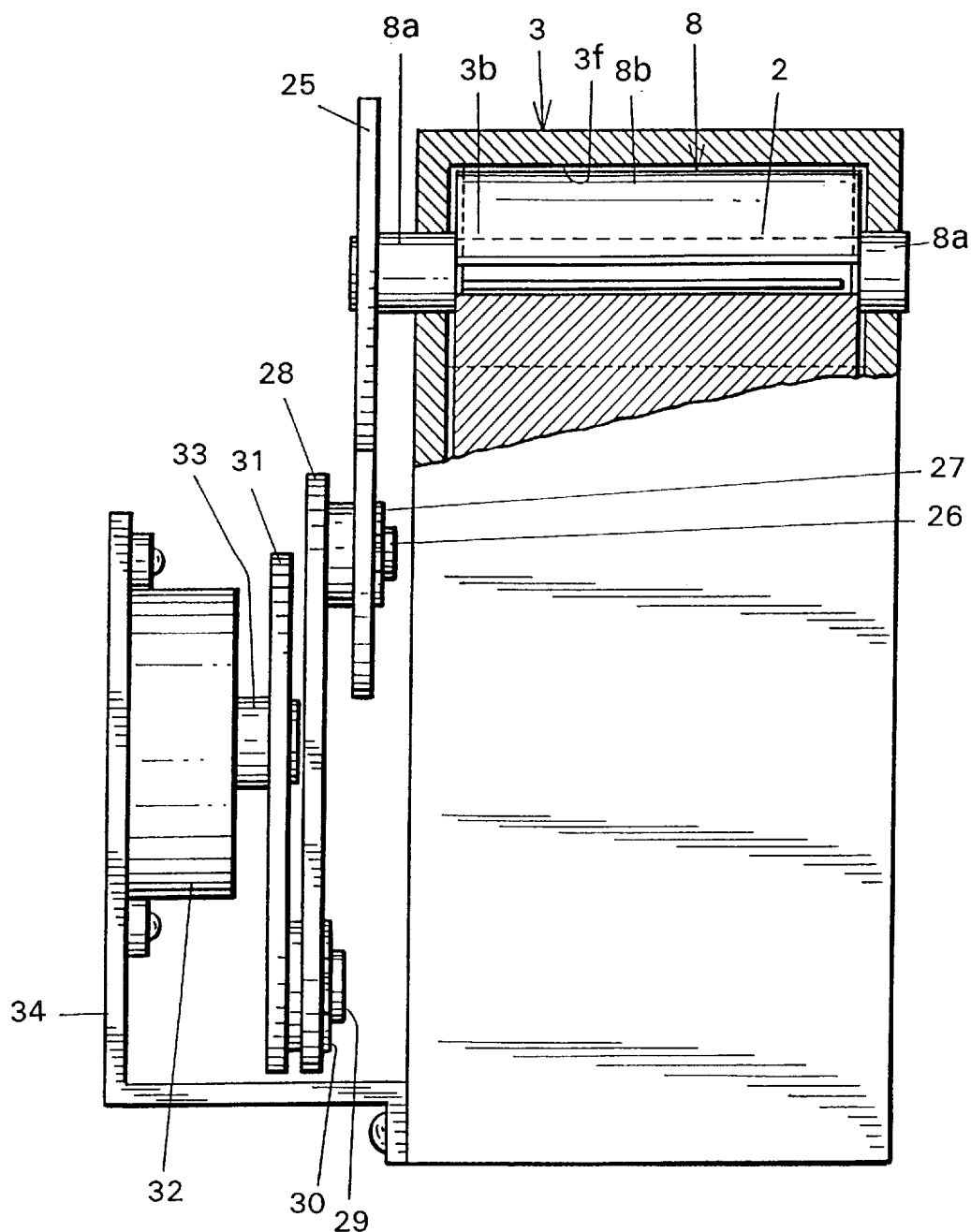
FIG. 13 illustrates a cross-section front view of a main part of the shutter device of a card reader of example 2.

FIGS. 12 and 13 show Example 2 wherein a rotary shutter is installed. FIG. 12 is a cross-section side view of a main part of a shutter device of a card reader. FIG. 13 is a cross-section front view of a main part of the shutter device of the card reader.

In this example, a shaft part 8a of a rotary shutter 8 is movably supported by a gate block 3. On the other end of the shaft part 8a, one end of a rotary arm 25 is fixed. A through hole is formed on the other end of the rotary arm 25, where a shaft 26 is inserted and held with E-ring 27. The shaft 26 is fixed at one end of an intermediate plate 28. A through hole is formed on the other end of the intermediate plate 28, where a shaft 29 is inserted and held with E-ring 30. The shaft 29 is fixed on a cam plate 31 which is fixed to an output shaft 33 of a motor 32. The motor 32 is mounted on a fish hook-like metal fitting 34 fixed on the gate block 3. Other parts remain the same as the mentioned Example 1 and their descriptions are omitted.

The gate block 3 comprises an insertion slot 3a to which a magnetic card is inserted, a driving path 3b through which the magnetic card is driven, a semicircular space 3f across upper the driving path 3b, and a horizontally long space 3g across the lower driving path 3b. A cutter blade 35 is fixed on the wall of the space 3g. The rotary shutter is comprised of a shaft section 8a and semi-circle piece 8b. The semi-circle 8 is formed so that it covers the entire width of the driving path 3b. One end of the semi-circle piece 8b is formed to be a cutter blade 8c. The rotary shutter 8 moves by means of a rotation of the mentioned motor 32 via the cam plate 31, the intermediate plate 28, and the rotary plate 25. They move, as controlled by a control system, between the solid line and the two-dots broken line. The rotary shutter is positioned at the two-dots broken line when closed; a detector 14 is set up at the upper edge of the rotary plate 25 when the shutter is in the closed state. The equivalent of the detect section 5a of the detection lever 5 in Example 1, which is not illustrated, faces the driving path 3b.

In this Example 2, when the magnetic card 2 is inserted from the insertion slot 3a into the driving path 3b, the detect section of the detection lever is actuated and the detected signals are provided by the detector, and at the same time, the information stored in the magnetic stripe 2a is read by the magnetic head, and the card is recognized as a magnetic card 2. The motor 32 is rotated via a control system, that is not illustrated, controlled by the detected signal output and/or the information reading signals. This rotation moves the semi-circle 8b of the rotary shutter 8 to the position of the solid line. The operation afterward remains the same as that of the mentioned Example 1.

In this example also, even if a trap is set up in the shutter device B of the card reader, the rotary shutter 8 is formed in such a way that the semi-circle 8b of the rotary shutter 8 covers the entire width of the driving path 3b when the semi-circle 8b of the rotary shutter 8 is rotated in the closing direction; therefore, the detector 14 detects that the semi-circle 8b of the rotary shutter 8 is not closed; as a result, as described above, the card reader main device A is disabled or an alarm, which is not illustrated, goes off. When the semi-circle 8b of the rotary shutter 8 is rotated in the closing direction, a soft or thin trap member can be cut off between the cutter blade 35 and the cutter blade 8c at one edge of the semi-circle 8b. In the case of a rigid or thick trap member that is difficult to cut, the detector 14 detects that the semi-circle 8b of the rotary shutter 8 is not closed.

In the above description, micro switches are illustrated for the detector 14 and 20, but they may also be detectors of luminescent elements. Also, the motor 32 may be of single rotation so that the shutter rotates in one direction.

EXAMPLE 3

Figure 14:
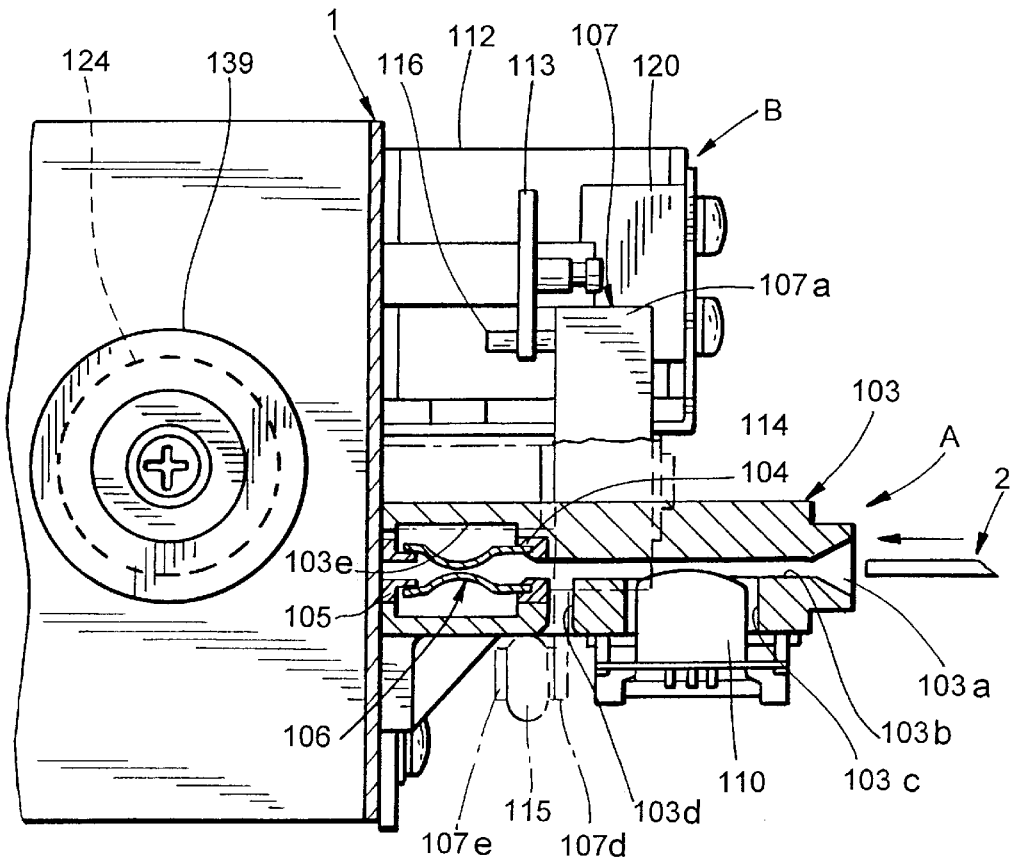
FIG. 14 illustrates example 3 of this invention and a cross-section side view of the main part of a detect mechanism for foreign matter inserted into the driving path of a card reader.
Figure 15:
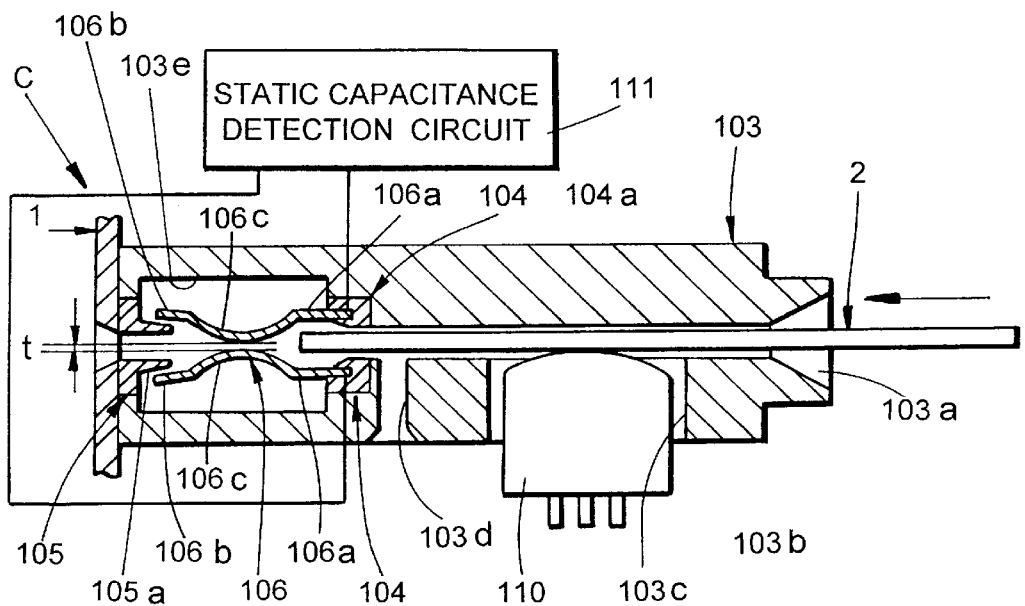
FIG. 15 illustrates a cross-section side view of the major part of the detect mechanism for foreign matter inserted into the driving path of the card reader of example 3.
Figure 16:
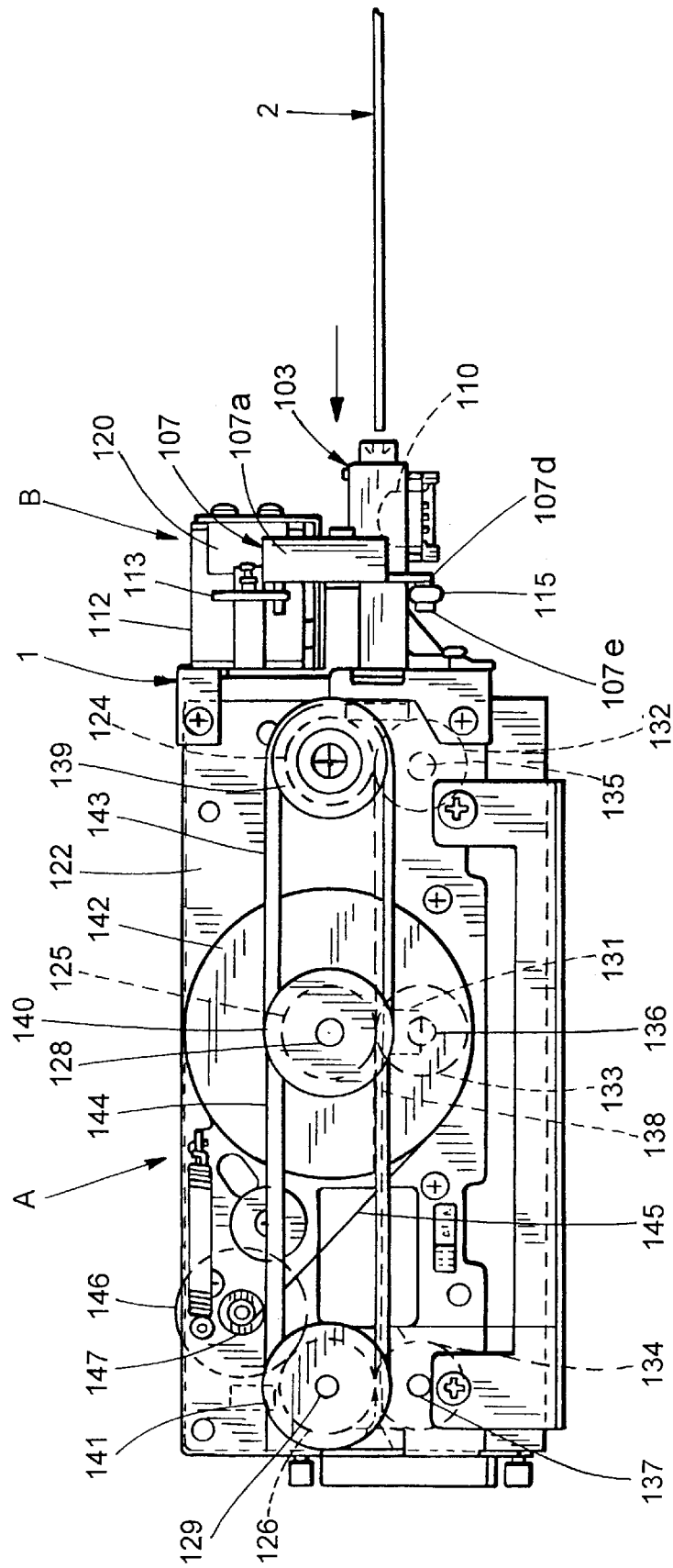
FIG. 16 illustrates a side view of the card reader of example 3 when a foreign matter insertion detect mechanism is installed.
Figure 17:
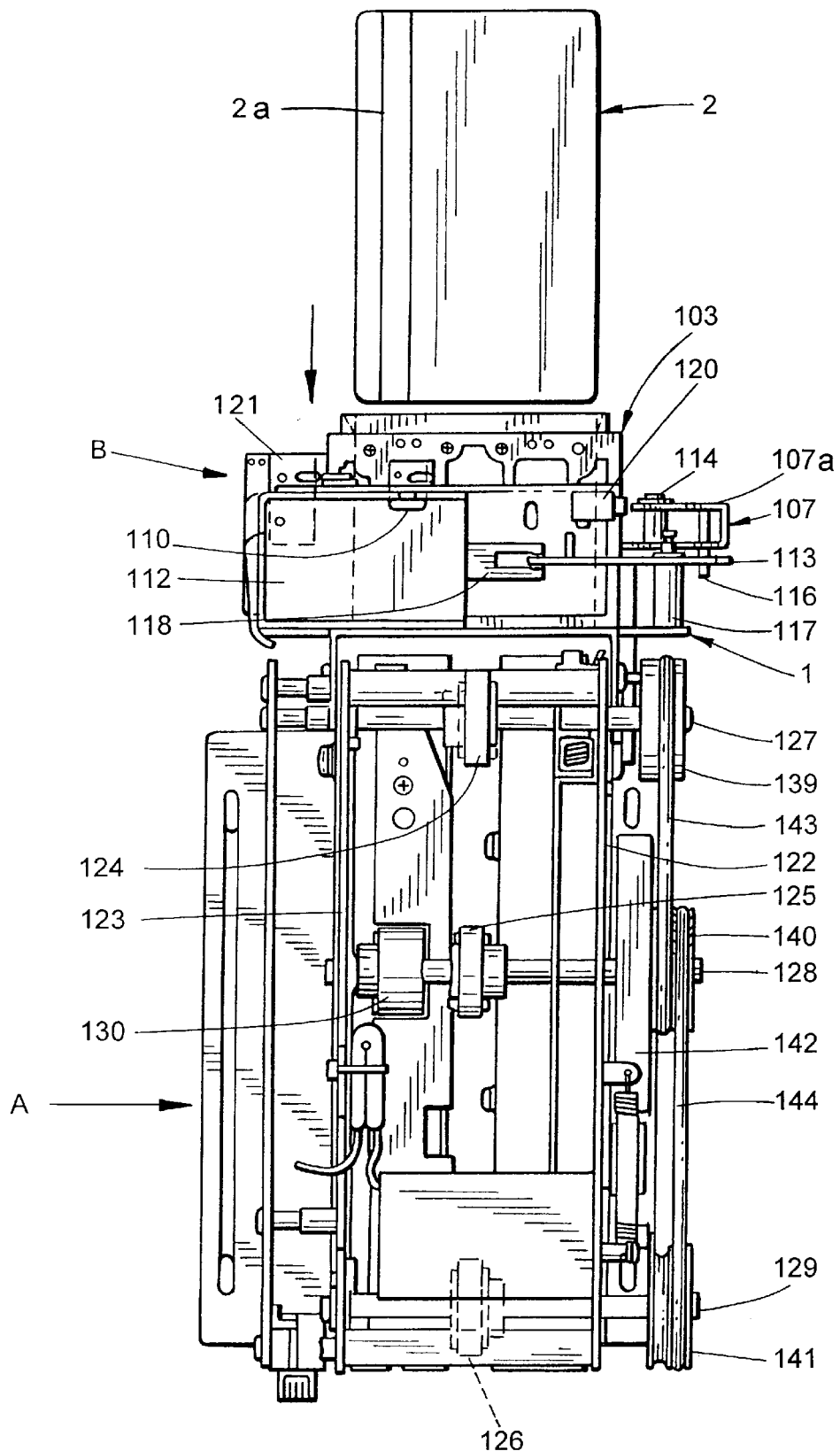
FIG. 17 illustrates a plain view of the card reader of example 3.

Next, Example 3 of this invention will be described referring to FIGS. 14 through 19. A foreign matter insertion detection mechanism C for the card reader driving path of a card reader is built in gate block 103, to which a magnetic card 2 is inserted and which is fixed on substrate 1 in FIG. 14; a shutter device B is installed on the gate block 103. In the gate block 103 are as shown in FIGS. 14 and 15: an insertion slot 103a for a magnetic card 2, a driving path 103b, a through hole 103c that allows a magnetic head 110 for detecting the magnetic card to be inserted, a side hole 103d through which a shutter plate that crosses the driving path 103b is inserted, and a space 103e where the foreign matter insertion detect mechanism C is installed. The magnetic head 110 is mounted to the gate block 103 with a resilient plate and the like.

The foreign matter insertion detect mechanism C is comprised of insulators 104 and 105 fixed in the space 103c in the upper, lower, front, and rear of the driving path 103b, a pair of metal members 106 for detecting static capacitance fixed on the insulators 104 and projected toward the insulators 105, and a static capacitance detection circuit 111 connected to the pair of the metal members 106. The pair of the metal members 106 are positioned to face each other all the way across the entire width of the driving path 103b.

The shutter device B is comprised of, in FIGS. 14 and 16 through 19, a solenoid 112 fixed on substrate 1, a shutter plate 107, an actuation plate 113, and a control system that is connected to the solenoid 112 but not illustrated.

The insulator 104 of the foreign matter insertion detect mechanism C is formed so that its back is a slope section 104a with respect to the driving path 103b when viewed form the card insertion slot side; the insulator 105 has a projection 105a formed toward the front. Regarding the pair of metal members 106, one end 106a is fixed on the insulator 104; the other end 106b is projected toward the up and down direction of the projection 105a of the insulator 105; at the center, a bowed section 106c is projected toward the driving path 103b. The upper and lower bowed sections 106c are formed facing each other at a distance "t" which is thinner than the thickness of the card 2 to maintain a specific static capacitance. The static capacitance detection circuit 111 connected to the pair of metal members 106 is connected to a control system that is not illustrated.

Figure 18:
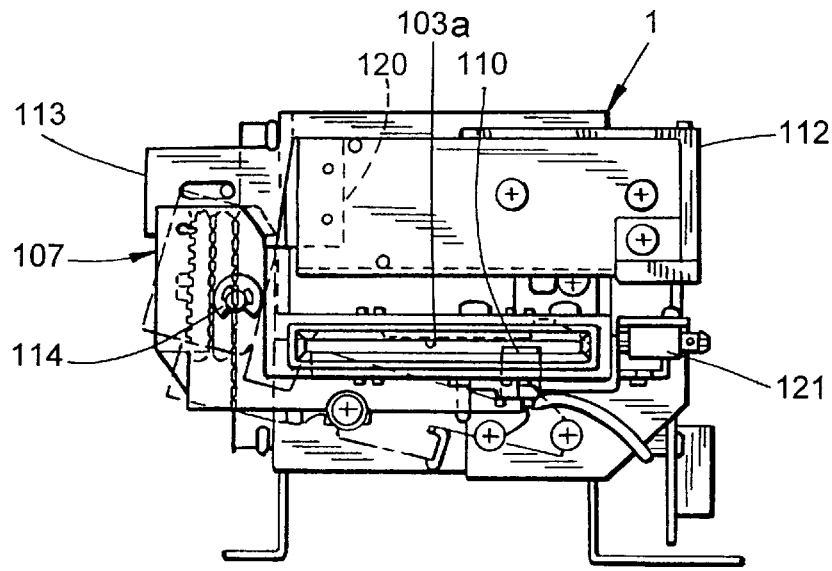
FIG. 18 illustrates a front view of the card reader of example 3.
Figure 19:
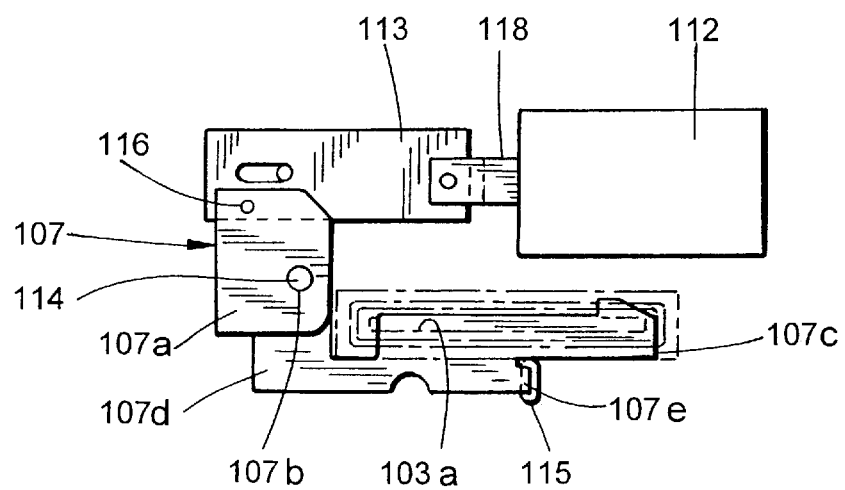
FIG. 19 illustrates a front view showing the constituents of the shutter device of example 3.

As shown in FIG. 18 and 19, the shutter plate 107 of the shutter device B is rotatably supported by a pillar 114 fixed on substrate 1 and transmits a force counterclockwise, by means of a spring that is not illustrated. The shutter plate 107 is comprised of a base 107a that is bent in a horizontally dented shape, a through hole 107b that is made on the base 107a where the pillar is inserted, an end 107c to close the driving path 103b, a connection section 107d, and a bent section 107e where a rubber ring is mounted. A pin 116 is fixed on the base 107a, that is inserted into and connected to a hole at one end of the actuation plate 113. The actuation plate 113 is movably supported by the pillar 117 fixed on substrate 1. The other end of the actuation plate 113 is connected to a plunger 118 that is movably inserted into a solenoid 112 and is made from iron core. The solenoid 112 is connected to a control system that is not illustrated.

A detector 120 comprised of micro switches that detect the closed state of the shutter plate 107 is mounted at the front of substrate 1. Mounted at the side of the insertion slot 103a is a detector 121 comprised of micro switches that detects a magnetic card 2 inserted into the insertion slot 103a, said detector being connected to a control system that is not illustrated. A hole is made to the insertion slot 103a and an actuator or a detection actuating piece is inserted therein.

Frame plates 122 and 123 of a card reader A are mounted on a plate that projects away from the card insertion slot of substrate 1. Shafts 127, 128, and 129 of feed rollers 124, 125, and 126 respectively are held on the frame plates 122 and 123. A padded roller 130 is fixed on the shaft 128 of the feed roller 125, and under the padded roller 130, a magnetic head 131 is installed to read and write the information stored on the magnetic stripes 2a of the magnetic card 2. Under the feed rollers 124, 125, and 126, shafts 135, 136, and 137 of padded rollers 132, 133, and 134 respectively are held on the frame plates 122 and 123. There is a driving path 138 of the card reader A between each feed roller and each padded roller. The feed rollers 124, 125, and 126 are rotated by a pulley 147 that is fixed to the rotary shaft of an electric motor via pulleys 139, 140, 141, and 142 that are fixed on the shafts 127, 128, and 129 and via belts 143, 144, and 145.

Reading or writing of the information recorded on a magnetic stripe 2a of a magnetic card 2 is processed as follows. When a magnetic card 2 is inserted into the driving path 103b through the insertion slot 103a, the card is detected by the detector 121 and at the same time, identified as a magnetic card by means of the magnetic head 110 that detects a magnetic card; it electrically charges a solenoid 112, and a plunger 118 is vacuumed. This vacuum pulls an actuation plate 113 to move the shutter plate 107. Moving the shutter plate 107 opens the shutter and the magnetic card 2 can be inserted deeply into the driving path 103b when the magnetic card 2 of the card reader A goes through the driving path 138 of the card reader A between the curved sections 106C of a pair of the metal members 106. After that, it is sent to the area between the feed rollers 124, 125, 126 and the feed pat rollers 132, 133, 134 so that the information recorded on the magnetic stripe 2a of the magnetic card 2 is read and at the same time, new information is written by means of the magnetic head 131. When the magnetic card 2 goes through the passage between the curved sections 106c of a pair of the metal members 106, static capacitance changes; however, with the changes generated by a regular magnetic card 2, a normal procedure continues.

Now, if the magnetic card 2 is taken out leaving foreign matter such as a trap in the driving path 103b of the gate block 103 or the driving path 138 of the card reader A, the shutter plate 107 cannot be closed because the foreign matter such as a trap remains between the curved sections 106c of the pair of metal members 106. If foreign matter such as a trap remains between the curved sections 106c of the pair of metal members 106, conductivity changes and static capacitance also changes even though the foreign matter such as the trap is a thin wire or film. This static capacitance change is detected by the static capacitance detection circuit 111. Otherwise, if the shutter plate 107 is not closed, the detector 120 detects the not-closed state and sends signals to a control system that is not illustrated; as a result, the card reader A is disabled, an invalid processing is displayed, or a buzzer goes off.

With the existence of a shutter plate 107, foreign matter such as a trap of a thin deformable film and the like can be caught under the shutter; however, if the static capacitance change is detected, the foreign matter such as a trap of a thin and deformable film and the like can be easily detected because of the conductivity change. Also, since it can be done with no contact, even a soft foreign matter such as a thread can be easily detected.

By including a detect mechanism for a foreign matter inserted into the driving path of the card reader as described above, even if a foreign matter such as a trap is set up to trap another's card, the foreign matter is detected by the static capacitance detection circuit 111 by means of the pair of metal members 106 facing each other all the way across the entire width of the driving path 103b which detects the change of static capacitance.

EXAMPLE 4

Figure 20:
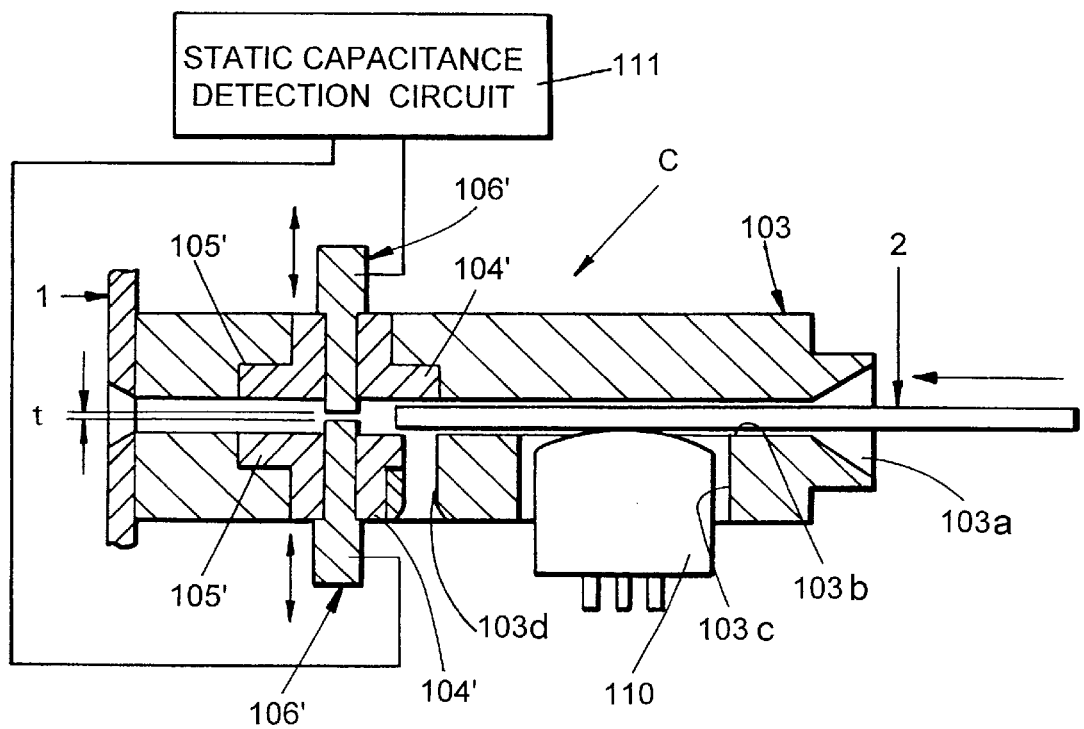
FIG. 20 illustrates example 4 of this invention and a cross-section side view of the main constituents of the detect mechanism for a foreign matter inserted into the driving path of the card reader.

FIG. 20 represents Example 4 of a foreign matter insertion detect mechanism positioned in the driving path of a card reader; FIG. 20 is a cross-section side view of the major part of a detect mechanism for foreign matter inserted into the driving path of a card reader. In this example, a gate block 103 has an insertion slot 103a for a magnetic card 2, a driving path 103b, a through hole 103c into which a magnetic head 110 for a magnetic card detection is inserted, a side hole 103d into which a shutter plate across the driving path 103b is inserted, and a space to accommodate a foreign matter insertion detect mechanism C. The foreign matter insertion detect mechanism C comprises insulators 104' and 105' that are fixed in the indented sections at the upper, lower, front, and rear of the driving path 103b, a pair of metal members 106' for static capacitance detection that can move up and down between the insulators 104' and 105', and a static capacitance detection circuit 111 that is connected to the pair of metal members 106'. The pair of metal members 106' face each other across the entire width of the driving path 103b. The pair of metal members 106' face each other at a distance "t" that is thinner than the thickness of a card 2 to maintain a specific capacitance. The up and down movement of a pair of the metal members 106' is generated by the up and down movement mechanism of a cam or the like that is rotated by a solenoid or an electric motor that are not illustrated. Other parts remain essentially the same as in the previously described Example 3 and further description is omitted here.

In FIG. 20, once a magnetic card 2 is inserted into the driving path 103b through insertion slot 103a, the card is detected by a detector 121 as previously described and also identified as a magnetic card by a magnetic head 110 that detects a magnetic card. Then, current flows to the solenoid and the shutter plate 107 is actuated. Further, the up and down movement (not illustrated) of the pair of metal members 106' is generated, and the distance between the metal members 106' opens wider than the thickness of the magnetic card 2; then the magnetic card 2 is pushed in through the driving path 138 of the card reader between the pair of metal members 106'. Static capacitance changes when the magnetic card 2 goes through the passage between a pair of the metal members 106'; however, the change caused by a regular magnetic card 2 allows a normal operation to continue.

If foreign matter such as a trap that is not illustrated is set up in the system, it is left between the pair of metal members 106' so that the shutter plate 107 cannot be closed. If foreign matter such as a trap is left between a pair of metal members 106', even though the foreign matter is a thin wire or a thin film, it changes conductivity (in the area), followed by change in static capacitance; therefore, the static capacitance detection circuit 111 can detect the change in static capacitance.

EXAMPLE 5

Figure 21:
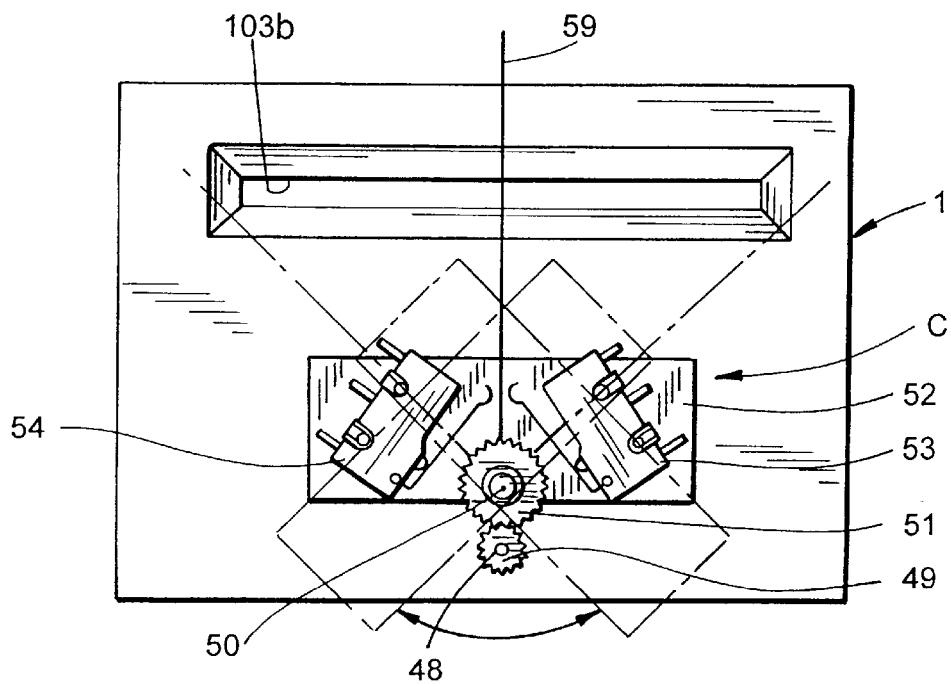
FIG. 21 illustrates example 5 of this invention and a front view of the detect mechanism for a foreign matter inserted into the driving path of the card reader.

FIG. 21 illustrates Example 5 of a detection mechanism C for foreign matter inserted in the driving path of a card reader and shows its front section.

In Example 5, a foreign matter insertion detect mechanism C is set up under the driving path 103b of a gate block that is projected from substrate 1. The foreign matter insertion detect mechanism C is described as follows: a gear 49 is fixed on a rotary shaft 48 of an electric motor that is not illustrated but mounted to substrate 1; a gear 51 that is held on a shaft 50 fixed on substrate 1 is engaged with the gear 49; a support plate 52 and one end of a scan member 59 made of thin wire is fixed to the gear 51; detectors 53 and 54 comprised of a pair of micro switches are mounted to the support plate 52 so that they face each other putting the scan member between. The detectors 53 and 54 are connected to a control system that is not illustrated.

The rotary shaft 48 of a electric motor that is not illustrated is constituted so that it can swing and rotate within a range of degrees at which the scan member 59 can scan the entire width of the driving path 103b, shown as two-dots broken lines. This rotary shaft 48 is designed to rotate when a card is taken out from the driving path 103b. Other parts practically remain the same as those of the previously described Example 3.

In this example, when a magnetic card 2 is taken out, the rotary shaft 48 is rotated to actuate the gear 51; the scan member 59 comprised of thin wire, the support plate 52, and detectors 53 and 54 comprised of a pair of micro switches; then, the scan member 59 scans the entire width of the driving path 103b as indicated by the two-dots broken lines. If any foreign matter such as a trap is left in the driving paths of the gate block or the card reader at the time, the scan member 59 is caught by the foreign matter, is bent, and is detected by one of the pair of detectors 53 and 54. The detectors 53 and 54 require a small force to be actuated. Combined with the scan member 59 made of thin wire, they can detect even a soft piece of foreign matter, such as a thread.

Only one of the pair of detectors 53 and 54 may be necessary in some cases.

Figure 22:
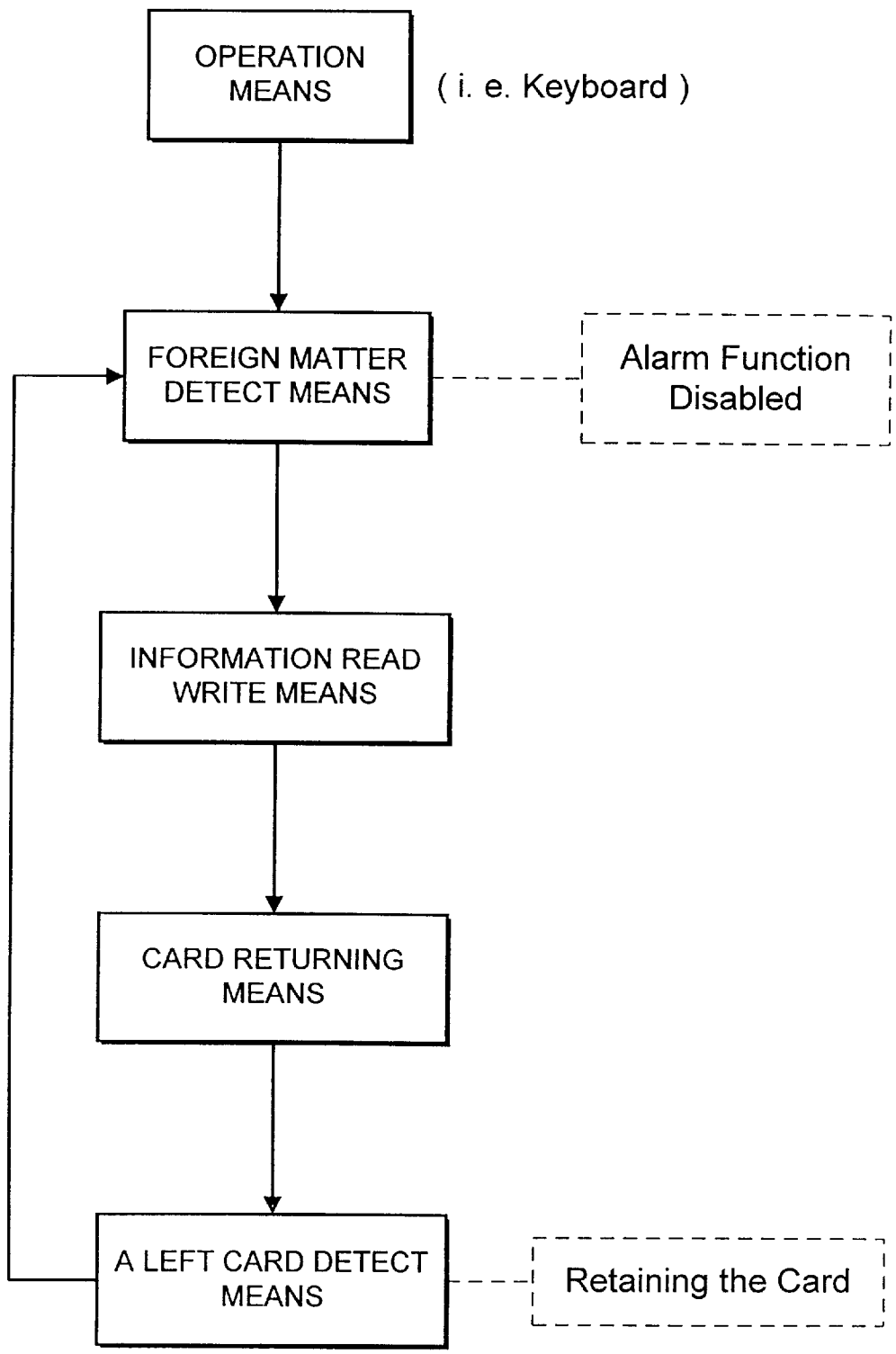
FIG. 22 illustrates a block drawing showing the functioning of this invention.
Figure 23:
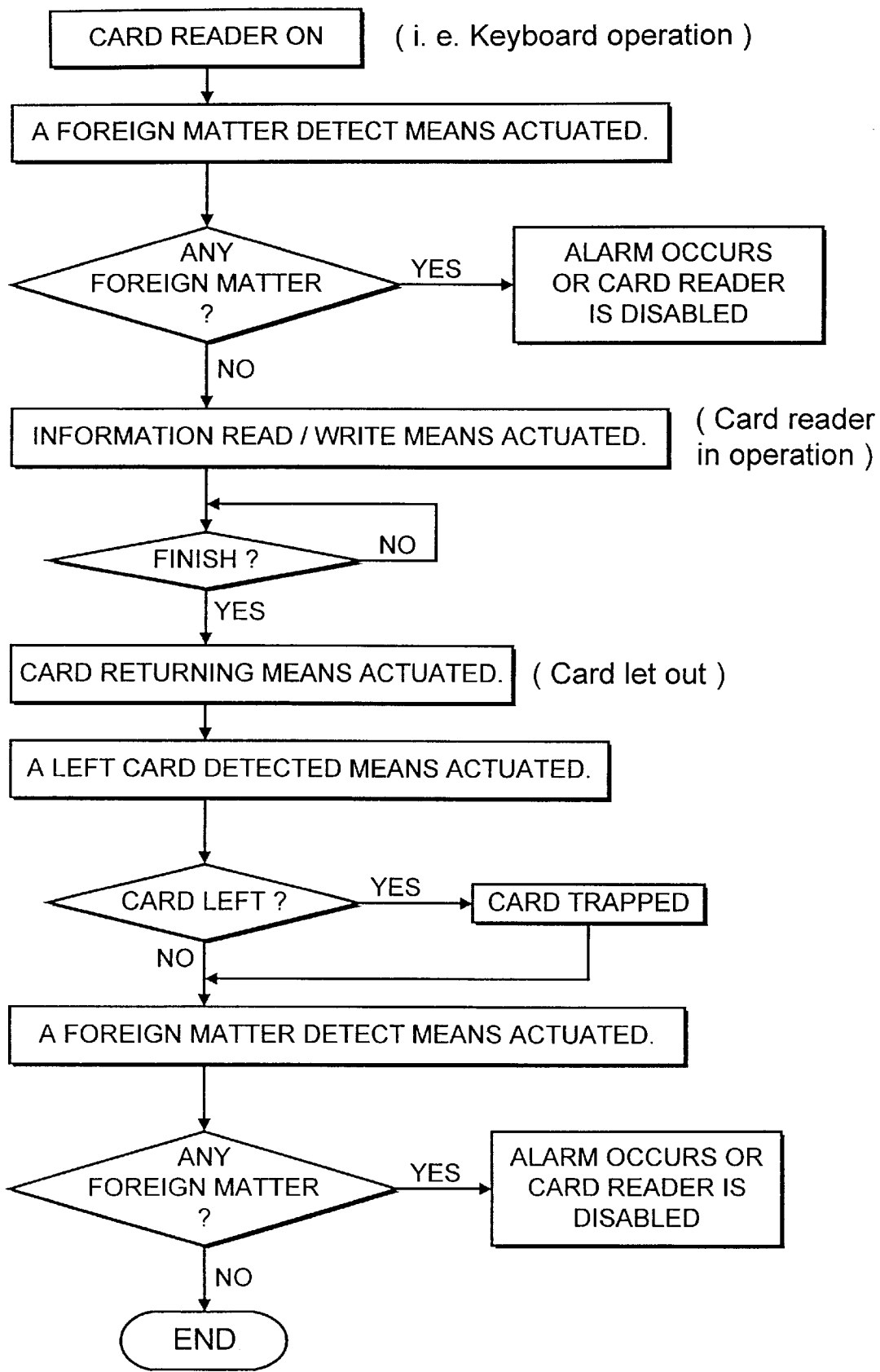
FIG. 23 illustrates an operation flowchart for FIG. 22.

Next, configurations of functions of a card reader of this invention for each of the above examples and its flow will be described referring to FIGS. 22 and 23.

If one operates the means to utilize an Automated Transfer Machine in which foreign matter is detected though a detection means, the following operations occur: when no foreign matter is detected, the card is taken into a card reader and the recorded information is read/written as usual; when foreign matter is detected, an alarm goes off and the card reader is disabled; therefore, the automated transfer machine is disabled to withdraw cash and the like. Then, when a normal use of the card reader progresses in a normal process, the card is let out by a card return means. A detection means for a card left in the machine detects at this time if the card is taken out by the holder; when the card is left, it is programmed that the card is taken into the machine again to prevent others from pulling it out. After the card is removed from the machine, foreign matter detection is performed by the above foreign matter detection means again; when foreign matter is detected, an alarm goes off and the card reader is disabled; as a result, automated transfer machine is disabled for cash withdrawal.

The above describes one example of the basic operations; the process may be modified within the scope of this invention.

Since this invention is constituted as described above, even if a trap member is set up to steal another's card, it can be detected by a foreign matter detection means. Therefore, a crime in which one steals another's card and uses it illegally can be prevented.

While the foregoing description and drawings represent the preferred embodiments of the present invention, it will be obvious to those skilled in the art that various changes and modifications may be made therein without departing from the true spirit and scope of the present invention.

What is claimed is:

1. In a card reader having a card insertion portion, a shutter for preventing an insertion of foreign matter into the card reader, a driving path for direction of an inserted card and a main card reading device; the improvement comprising:

detection means for determining a condition of said shutter during a card reading operation and for providing an output signal of said determination; and means responsive to said detection means output signal for restricting use of said reader when said shutter is in an improper condition when foreign matter is inserted in said driving path;

wherein said shutter covers the entire width of the driving path and said detection means detects a condition when said shutter is closed, said responsive means includes an alarm device for setting off an alarm when the detection means detects that the shutter is not closed when it should be; and, said shutter comprises a cutter blade for cutting any foreign matter positioned in the driving path through which said card is driven.

2. The card reader of claim 1, wherein said card is a magnetic card having a magnetic strip on which the information is recorded.

3. In a card reader having a card insertion portion, a shutter for preventing an insertion of foreign matter into the card reader, a driving path for direction of an inserted card and a main card reading device; the improvement comprising:

detection means for determining a condition of said shutter during a card reading operation and for providing an output signal of said determination; and means responsive to said detection means output signal for restricting use of said reader when said shutter is in an improper condition when foreign matter is inserted in said driving path;

wherein said shutter covers the entire width of the driving path and said detection means detects a condition when said shutter is closed, said responsive means disables said card reader when said detection means detects that the shutter is not closed when it should be; and said shutter comprises a cutter blade for cutting any foreign matter positioned in the driving path through which said card is driven.

4. In a card reader having a card insertion portion, a shutter for preventing an insertion of foreign matter into the card reader, a driving path for direction of an inserted card and a main card reading device; the improvement comprising:

detection means for determining a condition of said shutter during a card reading operation and for providing an output signal of said determination; and means responsive to said detection means output signal for restricting use of said reader when said shutter is in an improper condition when foreign matter is inserted in said driving path;

wherein said shutter covers the entire width of the driving path and said detection means detects a condition when said shutter is closed, said shutter is a rotary shutter that rotates axially; and said shutter has a blade for cutting any foreign matter positioned in the driving path on which said card passes.

5. The card reader of claim 3, wherein said card is a magnetic card having a magnetic strip on which the information is recorded.

6. The card reader of claim 4, wherein said card is a magnetic card having a magnetic strip on which the information is recorded.

7. In an authorization and transaction system comprising an information medium in a card form and a card reader having a card insertion portion, a shutter for preventing an insertion of foreign matter into the card reader, a driving path for direction of an inserted card and a main card reading device, the system further comprising:

detection means for determining a condition of said shutter during a card reading operation and for providing an output signal of said determination, said detection means operating before or after, authorization and transaction by said information medium; and means responsive to said detection means output signal for restricting use of said reader when said shutter is in an improper condition when foreign matter is inserted in said driving path, wherein said shutter covers the entire width of the driving path and said detection means detects a condition when said shutter is closed, said responsive means includes an alarm device for setting off an alarm when the detection means detects that the shutter is not closed when it should be, and said shutter comprises a cutter blade for cutting any foreign matter positioned in the driving path through which said card is driven.

8. The card reader of claim 7, wherein said card is a magnetic card having a magnetic strip on which the information is recorded.

9. In an authorization and transaction system comprising an information medium in a card form and a card reader having a card insertion portion, a shutter for preventing an insertion of foreign matter into the card reader, a driving path for direction of an inserted card and a main card reading device, the system further comprising:

detection means for determining a condition of said shutter during a card reading operation and for providing an output signal of said determination, said detection means operating before or after authorization and transaction by said information medium; and means responsive to said detection means output signal for restricting use of said reader when said shutter is in an improper condition when foreign matter is inserted in said driving path;

wherein said shutter covers the entire width of the driving path and said detection means detects a condition when said shutter is closed, said responsive means disables said card reader when said detection means detects that the shutter is not closed when it should be, and said shutter comprises a cutter positioned in the driving path through which said card is driven.

10. The card reader of claim 9, wherein said card is a magnetic card having a magnetic strip on which the information is recorded.

11. In an authorization and transaction system comprising an information medium in a card form and a card reader having a card insertion portion, a shutter for preventing an insertion of foreign matter into the card reader, a driving path for direction of an inserted card and a main card reading device, the system further comprising:

detection means for determining a condition of said shutter during a card reading operation and for providing all output signal of said determination, said detection means operating before or after authorization and transaction by said information medium; and means responsive to said detection means output signal for restricting use of said reader when said shutter is in an improper condition when foreign matter is inserted in said driving path, wherein said shutter covers the entire width of the driving path and said detection means detects a condition when said shutter is closed, said shutter is a rotary shutter that rotates axially; and said shutter has a blade for cutting any foreign matter positioned in the driving path on which said card passes.

12. The card reader of claim 11, wherein said card is a magnetic card having a magnetic strip on which the information is recorded.

* * * * *